United States Patent [19]

Harte

[11] Patent Number: 4,576,579

[45] Date of Patent: Mar. 18, 1986

[54] INSTRUCTIONAL AND TESTING APPARATUS WITH SWITCH CLOSURE AT TWO DIFFERENT DEPTHS

[76] Inventor: J. Richard Harte, 10 W. Concord, Kansas City, Mo. 64112

[21] Appl. No.: 633,578

[22] Filed: Jul. 23, 1984

[51] Int. Cl.$^4$ ............................................. G09B 7/06
[52] U.S. Cl. .................................... 434/334; 434/339
[58] Field of Search ............... 434/339, 334; 200/5 A, 200/159 B

[56] References Cited

U.S. PATENT DOCUMENTS

| | | | |
|---|---|---|---|
| 1,644,160 | 10/1927 | Thompson | 434/334 |
| 2,540,363 | 2/1951 | Wistar | 434/334 |
| 3,057,082 | 10/1962 | Wellington | 434/338 |
| 3,106,027 | 10/1963 | Thelen | 434/339 |
| 3,177,595 | 4/1965 | Yonkers | 434/334 |
| 3,421,231 | 1/1969 | Kane | 434/339 |
| 3,747,229 | 7/1973 | Harte | 434/334 |
| 3,771,240 | 11/1973 | Matui | 434/339 |
| 3,902,255 | 9/1975 | Harte | 434/334 |
| 3,949,489 | 4/1976 | Gallucci | 434/338 |
| 3,964,176 | 6/1976 | Harte | 434/334 |
| 4,010,553 | 3/1977 | Bennett | 434/338 |
| 4,065,858 | 1/1978 | Harte | 434/334 |
| 4,300,029 | 11/1981 | Maser | 200/159 B |
| 4,302,647 | 11/1981 | Kandler et al. | 200/159 B |
| 4,449,943 | 5/1964 | Harte | 434/334 |
| 4,453,920 | 6/1984 | Harte | 434/334 |

Primary Examiner—William H. Grieb

Attorney, Agent, or Firm—D. A. N. Chase; Michael Yakimo, Jr.

[57] ABSTRACT

This invention provides students with immediate feedback as to the correctness of their responses by closing switches at two different depths. A holding frame aligns six sheets in layers, one above another. Holes that are punched through some of the six sheets of material are all aligned on the same grid pattern. The top sheet is an instructional sheet that has response areas punched in it at the site of correct and incorrect answers. The second sheet down contains no holes, is elastic and electroconductive, and hides the depth of the underlying holes from the student. The third sheet down is non-conductive and has the entire grid of holes punched in it. The fourth sheet down is electroconductive, and has holes punched in it only at correct answer areas. The fifth sheet down is non-conductive and has holes punched in it only at correct answer areas. The sixth sheet down is non-conductive, but contains electroconductive inserts at all correct answer areas. Instructional sheets have all incorrect answers by response areas that are over shallow holes, and have all correct answers by response areas that are above deep holes. Electric circuits that indicate to the student when he has made a correct or incorrect selection are completed when the student uses a stylus to push the elastic electroconductive sheet to the bottom of the shallow or deep hole where this sheet contacts other electroconductive material.

4 Claims, 8 Drawing Figures

INSTRUCTIONAL AND TESTING APPARATUS WITH SWITCH CLOSURE AT TWO DIFFERENT DEPTHS

This is an improvement in instructional and testing apparatus of the type that provides immediate feedback to students as to correct and incorrect responses by a variety of means, and it also provides a way that a student's performance can be tested or monitored on an ongoing basis and this information stored in a computer's memory.

In my U.S. Pat. No. 4,453,920, I have described and illustrated a grid of holes of two different depths, with electroconductive material at the bottoms of each hole, and where said electroconductive material can be contacted by an electroconductive stylus, said stylus having been pushed through response areas that represent correct and incorrect answers, resulting in the activation of electric circuits that are completed when the stylus touches the electroconductive material that is at the bottom of holes of two different depths. The present invention is a variation in the concept of having electrical contact or switches closed at two different depths, one depth indicating that a correct response was made, and the other depth indicating that an incorrect response was made.

With this present invention, what is new is: (1) the use of an elastic and electroconductive sheet of material immediately under the instructional sheet, said sheet of elastic and electroconductive material covering the entire surface of the grid of underlying shallow and deep holes, thereby obscuring the depth of said holes from the student who is using the instructional apparatus; and (2) the use of the elastic and electroconductive properties of this sheet of material to complete an electric circuit when a nonconductive stylus is used to push this elastic and electroconductive material to the bottom of the shallow and deep holes where this electroconductive sheet contacts other electroconductive material, thereby closing an electric circuit. This instructional apparatus can be connected with one or more electrical mechanisms that give immediate feedback to the student as to his or her correct and incorrect responses.

One of the types of mechanisms with which this teaching machine can be linked is a computer. Large computers may be programmed to accommodate input from more than one instructional apparatus simultaneously. Thus a number of students may use the same computer at the same time and at the end of a practice or testing session, the computer can be directed to print out a record of the student's performance on all of the instructional sheets to which they have responded during that period. The computer can also record and retain in its memory the performance of each student on each instructional sheet, and the date and sequence of the instructional sheets to which the student has responded. This information can then be analyzed in various ways and this information fed back to the student and/or teacher.

In recent years computers and related components have become less expensive. This lower cost of computers has been accompanied by their greater utilization in business, industry, the military, medicine, education, and in scientific research. Advances in microchips and related electronic hardware provide for a more cost-effective way of producing and operating highly sophisticated electronic mechanisms. However, much information can still be placed on the printed page, and this type of information is easy, simple, and comparatively inexpensive to design and produce. Thus a computer-linked teaching machine that uses the same printed instructional sheets that can also be used on a simpler non-electronic type of teaching machine would appear to offer a number of advantages over teaching machines or instructional apparatus that utilize only video tube displays or printouts. This would make the system less costly for schools or other instructional programs, as a student could use the simpler non-electronic teaching machine to get immediate feedback while learning the skills and concepts in a particular curriculum, and after these skills and concepts have been sufficiently mastered, the student could then respond to the same instructional sheets on the computer-linked teaching machine. This computer-linked teaching machine could then display the student's performance on a video screen, or have it printed out on a printer. The computer could also store information about the student's past and present performance, and evaluate or analyze this information in various ways. Having a computer-linked teaching machine that would perform as described above would lessen the amount of time teachers spend in grading papers and scoring tests.

Thus, with proper construction, another advantage of this invention is that it can retain the same grid pattern of shallow and deep holes as the simpler teaching machine that uses printed sheets which are made reuseable by punching out the response areas, and can thus use the same instructional sheets as this simpler and less expensive mechanism.

This invention is an improvement over the instructional apparatus that is described and illustrated in my aforesaid U.S. Pat. No. 4,453,920 in that: (1) the grid of shallow and deep holes is always hidden from the student; (2) the student uses a non-conductive stylus; (3) it is less expensive to produce; (4) part of its construction can be adapted to membrane switches; and (5) it does not require that a punching sheet be sandwiched between the reuseable instructional sheets and the grid of shallow and deep holes.

The elastic and electroconductive sheets described in this invention can be made from either elastic plastics that can be made electroconductive, or from rubber that contains a high percent of carbon which makes it electroconductive while retaining its elastic properties.

When connected to a computer, disconnecting sources of immediate feedback to the student changes this mechanism from a teaching machine into a testing machine.

DETAILED DESCRIPTION

Figure 5:
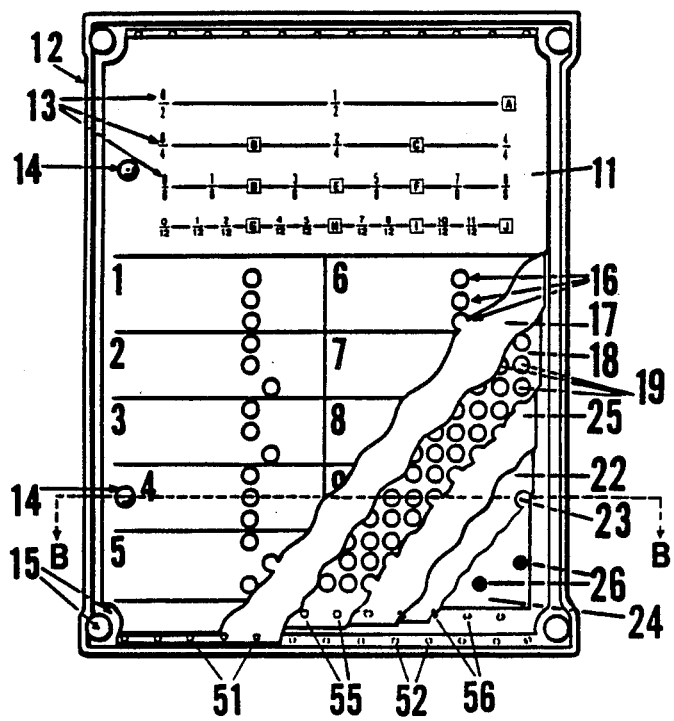
FIG. 5 is a slight modification of FIG. 2, that allows electrical circuits to be completed in a slightly different way than in FIG. 2.
Figure 6:
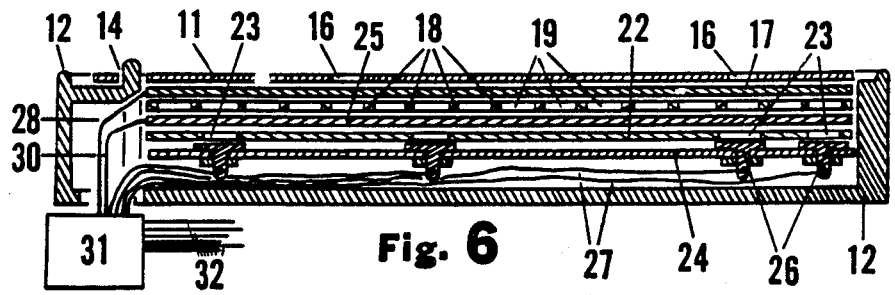
FIG. 6 is a cross-sectional view of FIG. 5 along a broken line B—B.
Figure 7:
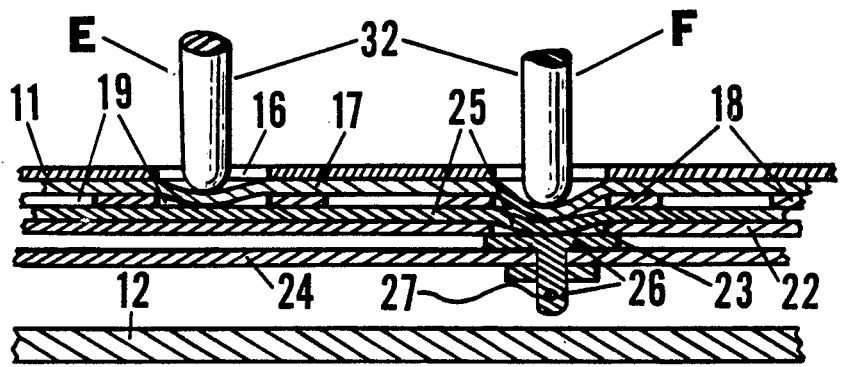
FIG. 7 is an enlarged detail of FIG. 6 that shows the stylus in both a shallow and in a deep depression.

FIGS. 1, 2, 3 and 4 show one variation of the way electrical circuits are closed in this invention. FIGS. 5, 6 and 7 show a second variation of the manner of closing electrical circuits in this invention. In most respects the two variations are identical. In both variations, instructional sheet 11 is positioned on top of holding frame 12. Instructional sheet 11 has a display area 13 for illustrating a variety of material that is to be taught to the student. On instructional sheet 11, below display area 13, are ten question and answer areas that are numbered 1 through 10. Instructional sheet 11 has two positioning holes 14 punched in it that enable the instructional sheet to be properly positioned on two pegs that protrude upward from the holding frame. Each corner of holding frame 12 has a corner post 15 with a slot at its base; said slot receives one of the corners of instructional sheet 11 and holds it in proper alignment over elastic-electroconductive sheet 17. Response areas 16 in instructional sheet 11 may be printed circles, or punched-out circular areas. Response areas 16 in instructional sheet 11 are positioned so as to be located over some of the grid of holes 19 that are punched or molded in non-electroconductive sheet of material 18. Positioned directly under non-electroconductive sheet of material 18 is a sheet of electroconductive material 20, that has holes 21 precisely punched in it at all of the response areas 16 that have been designated as correct answer areas. Positioned directly under electroconductive sheet 20 is a sheet of non-elastic, non-electroconductive material 22 which has holes 23 punched in it at all of the grid of holes 19 that correspond to correct answers. Positioned under sheet of non-electroconductive material 22 is sheet of non-electroconductive material 24 that has electroconductive inserts 26 fastened in through holes in sheet 24. Electroconductive inserts 26 are positioned beneath all of holes in the grid of holes 19 that correspond to correct answers. From each electroconductive insert 26 are wires 27 that go to a connecting terminal block 31. Wire 28 connects the elastic sheet of electroconductive material 17 with connecting terminal 31. Wire 29 connects electroconductive sheet 20 with connecting terminal 31. Fasteners 51 hold elastic sheet 17 in position on holding frame 12 and are fastened to frame 12 at through holes 52. Fasteners 53 hold sheets 18, 20 and 22 in position within holding frame 12 at through holes 54.

Figure 4:
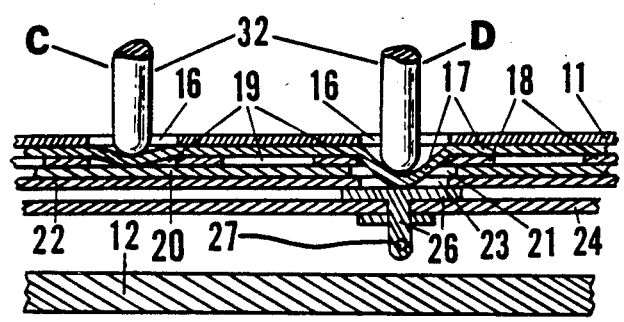
FIG. 4 is an enlarged detailed view of FIG. 3, that shows a stylus in both a shallow and a deep depression.

FIG. 4 shows a ball-tipped, non-electroconductive stylus 32 in both the C position and in the D position. In the C position, stylus 32 has been pushed through a response area 16 that is adjacent to an incorrect answer printed on instructional sheet 11. Stylus 32 in the C position has pushed elastic and electroconductive sheet 17 to the bottom of one of the grid of holes 19 where it has made contact with electroconductive sheet 20, and thereby has closed an electric circuit indicating that an incorrect selection has been made. Wires 28 and 29 transmit information about this circuit being closed to connecting terminal 31. FIG. 4 also shows ball-tipped stylus 32 in the D position where it has been pushed down through a response area 16 and has contacted sheet of elastic material 17, and has deflected this sheet down through holes 21 and 23 to contact electroconductive insert 26 to close an electric circuit. Wires 27 and 28 transmit information about the closing of this circuit to connecting terminal 31.

Figure 1:
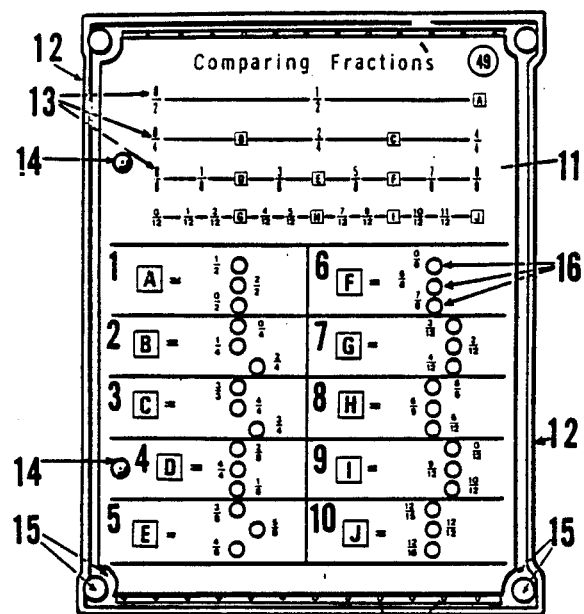
FIG. 1 is a plan view of the instructional and testing apparatus that has an instructional and testing sheet positioned on its upper surface.
Figure 2:
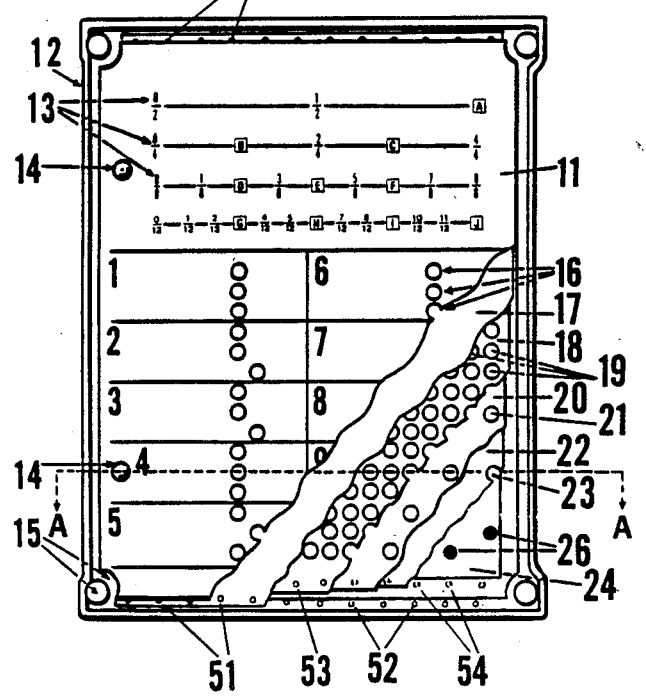
FIG. 2 shows partial cut-away views of FIG. 1, showing the different layers of material that lie under the instructional sheet.
Figure 3:
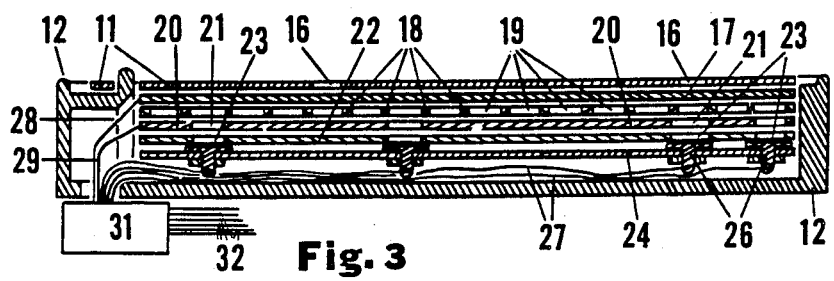
FIG. 3 is a cross-sectional view along broken line A—A in FIG. 2.

FIGS. 5, 6 and 7 illustrate a second way that electrical circuits can be completed or closed with this invention. The structure and components of the instructional apparatus illustrated in FIGS. 5, 6 and 7 is identical to the structure and components of the instructional apparatus illustrated in FIGS. 2, 3 and 4, with the exception that electroconductive and non-elastic sheet 20 which has holes 21 punched in it at correct answer areas as is illustrated in FIGS. 2, 3 and 4, has been replaced by electroconductive and elastic sheet 25 which contains no through holes as is illustrated in FIGS. 5, 6 and 7; also wire 30 connects elastic and electroconductive sheet 25 with electrical connecting terminal 31, in place of wire 29 connecting sheet 20 with connecting terminal 31. The arrangement present in FIGS. 5, 6 and 7 allows electrical circuits for correct responses to be closed in a different way. This is best illustrated in FIG. 7, where stylus 32 is in the F position. With this arrangement, three electroconductive elements all have to be in contact before a correct response is recorded. The three electroconductive elements needed to complete the correct answer circuit in this arrangement are: sheet 17, sheet 25, and insert 26. Fasteners 51 hold elastic sheet 17 in position on holding frame 12 by means of through holes 52. Fasteners 55 hold sheets 18, 22 and 25 in position within holding frame 12 at through holes 56 in frame 12.

Figure 8:
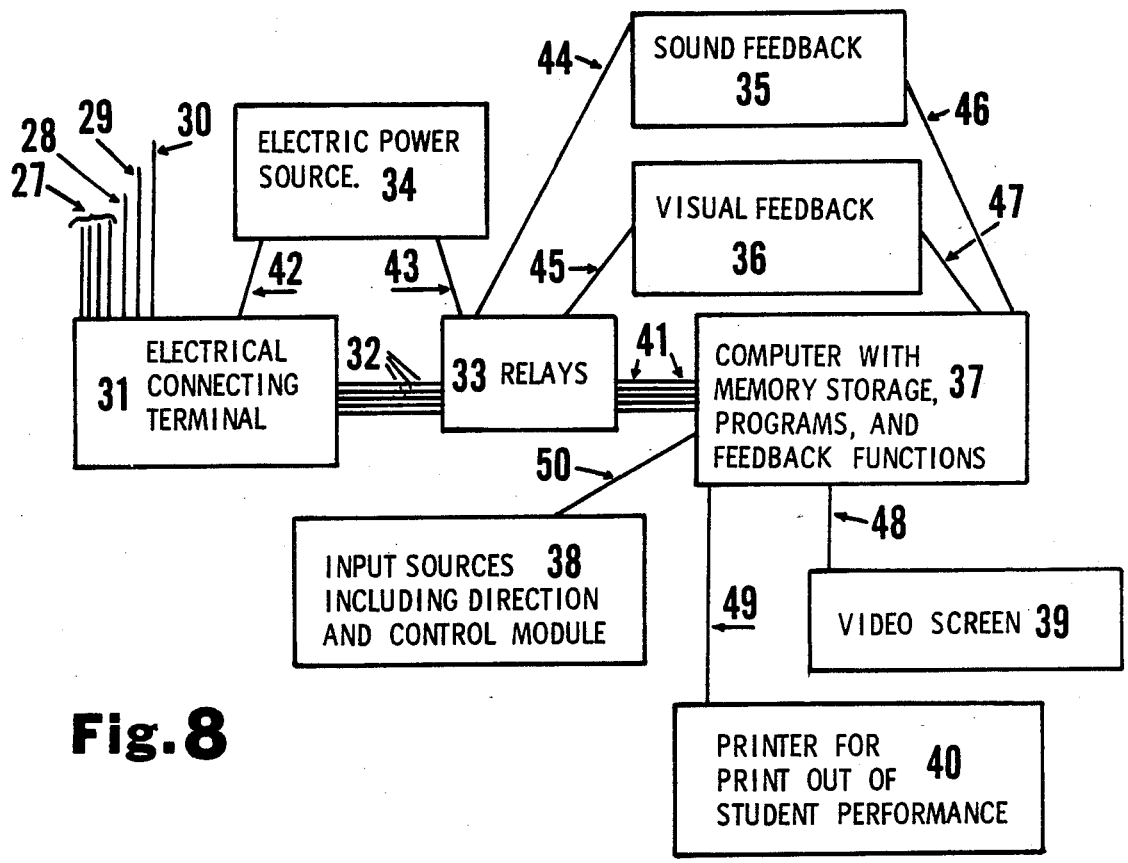
FIG. 8 is a diagram showing various components that can be connected to the teaching machine.

FIG. 8 shows how electrical connecting terminal 31 sends this information to relays 33 by way of wires 32. From relays 33, the activation of electrical circuits indicating correct and incorrect responses may be relayed to: sound feedback 35, visual feedback 36, or computer 37, where this information may be displayed on video screen 39 or printed out on printer 40. Power source 34 supplies the necessary electric power for the circuits of the instructional apparatus and for the related equipment with which it can be connected. Input sources 38 include the necessary switches, and a keyboard with a direction and control module. Wires 41, 42, 43, 44, 45, 46, 47, 48, 49 and 50 connect the various components as is illustrated in FIG. 8.

The above-described components and relationships permit printed instructional sheets 11 to have a number of response areas 16, which correspond to correct and incorrect answers. The correctness or incorrectness of the response is hidden from the student by the elastic-electroconductive sheet 17 that lies immediately under instructional sheet 11. The student uses a non-electroconductive stylus 32 with a ball-shaped tip to push through the response area 16 that he or she believes is the correct answer. Beneath all response areas 16 that are incorrect answers, shallow depressions are created by holes 19 in sheet 18. At all incorrect response areas an electric circuit is completed when stylus 32 pushes elastic and electroconductive sheet 17 to the bottom of this shallow depression and sheet 17 contacts the electroconductive sheet of material that is at the bottom of this shallow depression. At all incorrect response areas the sheet of electroconductive material that is at the bottom of this shallow depression can be deflected no further in a downward direction by continued pressure on sheet 17 by stylus 32. At all correct response areas stylus 32 pushes elastic and electroconductive sheet 17 to the bottom of a deep depression which lies under all correct response areas, and an electric circuit is completed by one of two methods. In FIGS. 2, 3 and 4, electroconductive sheet 17 directly contacts electroconductive insert 26 to close the electric circuit to indicate that a correct response has occurred. In FIGS. 5, 6 and 7, electroconductive sheet 17 first contacts elastic and electroconductive sheet 25 and with continued downward pressure on stylus 32, electroconductive and elastic sheet 25 is deflected downward to the bottom of the deep depression where it contacts electroconductive insert 26, thus closing an electric circuit indicating that a correct response has been made. FIG. 8 is a schematic diagram illustrating how wires carrying electric currents connect the various components and allow various types of immediate feedback to be transmitted to the student, or stored in a computer for later analysis and feedback by video screen or by a printout of the student's performance.

To change or modify the instructional and testing apparatus described above into an apparatus that is used solely for testing, it is necessary to remove the sources of immediate feedback to the student. This can be done by disconnecting sources of immediate feedback, such as: sound feedback 35; visual feedback 36; and programming computer 37 to not display the student's performance on video screen 39, and to not print out the student's performance on printer 40 until so directed by the instructor.

Having thus described the invention, what is claimed as new and desired to be secured by Letters Patent is:

1. An instructional apparatus comprising:
   an instructional sheet having zones thereon indicating at least two types of answer choices,
   holding means provided with an upper surface for receiving said instructional sheet, and including a support member presenting said surface and having holes therein in alignment with corresponding zones on said instructional sheet,
   an electrically conductive, elastic sheet element sandwiched between said instructional sheet and said upper surface and having a normal, planar disposition, said sheet element being capable of substantial deflection into an individual hole in said member when a stylus is applied to a selected zone on said instructional sheet,
   electrical contact structure beneath said member and engageable by a deflected portion of said sheet element when said portion is pushed through a corresponding hole in said member by said stylus,
   said structure having contact means disposed at two different depths relative to said surface corresponding to said two types of answer choices, said contact means including a second electrically conductive sheet element underlying said member and engageable by said deflected portion of the elastic sheet element upon deflection thereof to one of said two different depths,
   said structure further having a third sheet element underlying said second element and provided with openings therein corresponding to the type of answer choice represented by the greater of said two different depths, and said contact means further including components thereof beneath said third sheet element at said greater depth in alignment with respective openings in said third sheet element for engagement by said conductive sheet element upon deflection of a part thereof by a stylus through a corresponding opening in said third element in response to the selection of an answer choice corresponding to the greater depth, and
   circuit means connected to said elastic sheet element and said contact means for communicating the types of responses of a student to electrical apparatus for feedback or information processing.

2. The instructional apparatus as claimed in claim 1, wherein said second sheet element is rigid and apertured to permit deflection of said elastic sheet element into engagement with said contact components.

3. The instructional apparatus as claimed in claim 1, wherein said second sheet element is elastic and is deflected by said elastic sheet element into engagement with an individual contact component upon selection of an answer choice corresponding to said greater depth.

4. An instructional apparatus comprising:
   an instructional sheet having zones thereon indicating at least two types of answer choices, correct and incorrect,
   holding means provided with an upper surface for receiving said instructional sheet, and including a sheet-like member presenting said surface and having holes therethrough in alignment with corresponding zones on said instructional sheet,
   a first electrically conductive, elastic sheet element sandwiched between said instructional sheet and said upper surface and having a normal, planar disposition, said first sheet element being capable of substantial deflection into an individual hole in said member when a stylus is applied to a selected zone on said instructional sheet,
   a second electrically conductive sheet element underlying said member and engageable by a deflected portion of said first sheet element when said portion is pushed through a corresponding hole in said member by said stylus,
   a third sheet element underlying said second element and having openings therein corresponding to one of said types of answer choices,
   electrical contact means beneath said third sheet element in alignment with respective openings therein for engagement by said first, conductive sheet element upon deflection of a part thereof by a stylus through a corresponding opening in said third element in response to the selection of an answer of said one type, and
   circuit means connected to said first and second sheet elements and said contact means for communicating the types of responses of a student to electrical apparatus for feedback or information processing.

* * * * *